(12) United States Patent
Nakanishi (10) Patent No.: US 10,290,170 B2
(45) Date of Patent: May 14, 2019

(54) APPARATUS AND METHOD FOR STACKING BANKNOTES, AND SYSTEM FOR PACKAGING BANKNOTES

(71) Applicants: Kabushiki Kaisha Toshiba, Tokyo (JP); Toshiba Infrastructure Systems & Solutions Corporation, Kawasaki-shi, Kanagawa (JP)

(72) Inventor: Ayaka Nakanishi, Kanagawa (JP)

(73) Assignees: Kabushiki Kaisha Toshiba, Tokyo (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 15/873,471

(22) Filed: Jan. 17, 2018

(65) Prior Publication Data

US 2018/0204406 A1 Jul. 19, 2018

(30) Foreign Application Priority Data

Jan. 17, 2017 (JP) .................................. 2017-005707

(51) Int. Cl.
  *B65B 13/02* (2006.01)
  *B65B 27/08* (2006.01)
  (Continued)

(52) U.S. Cl.
  CPC .............. *G07D 11/50* (2019.01); *B65B 13/02* (2013.01); *B65B 27/08* (2013.01); *B65H 31/28* (2013.01);
  (Continued)

(58) Field of Classification Search
  CPC .................................. B65B 13/02; B65B 27/08
  (Continued)

(56) References Cited

U.S. PATENT DOCUMENTS 4,402,410 A * 9/1983 Ohba ................. G07D 11/0084
                                                      209/534
4,483,124 A * 11/1984 Ohba ..................... B65B 27/08
                                                      209/534
(Continued)

FOREIGN PATENT DOCUMENTS

EP        0040539 A2    11/1981
GB        2407172 A      4/2005
(Continued)

OTHER PUBLICATIONS

Extended European Search Report issued in related EPC application No. 18151823.4, dated Jun. 5, 2018 (7 pages).

*Primary Examiner* — Terrell H Matthews
(74) *Attorney, Agent, or Firm* — Baker Botts L.L.P.

(57) ABSTRACT

According to one embodiment, a banknote stacking apparatus includes a first weight measurement part, a second weight measurement part, and a controller. The first weight measurement part measures a weight of a first banknote bundle. Banknotes laminated along a thickness direction of the banknotes are bundled as the first banknote bundle. The second weight measurement part measures a weight of a second banknote bundle. A first predetermined number of first banknote bundles laminated are bundled as the second banknote bundle. The controller compares the weight measured by the first weight measurement part with the weight measured by the second weight measurement part, and decides whether the number of first banknote bundles bundled as the second banknote bundle is smaller than the first predetermined number, based on a comparison result of the weight.

6 Claims, 10 Drawing Sheets

(51) Int. Cl.
*G07D 11/50* (2019.01)
*B65H 31/28* (2006.01)
*G01G 19/42* (2006.01)
*G01G 17/02* (2006.01)

(52) U.S. Cl.
CPC ......... *G01G 19/42* (2013.01); *B65H 2515/10* (2013.01); *B65H 2701/1829* (2013.01); *B65H 2701/1912* (2013.01); *G01G 17/02* (2013.01)

(58) Field of Classification Search
USPC ................................ 209/534, 552, 592, 645
See application file for complete search history.

(56) References Cited

U.S. PATENT DOCUMENTS

| | | | | |
|---|---|---|---|---|
| 5,017,773 | A * | 5/1991 | Sato | ........................ G06M 7/00 |
| | | | | 209/534 |
| 6,323,452 | B1 * | 11/2001 | Bonnet | ................... B07C 3/082 |
| | | | | 198/370.04 |
| 2004/0154964 | A1 * | 8/2004 | Jones | ................. G07D 11/0066 |
| | | | | 209/534 |
| 2015/0066188 | A1 | 3/2015 | Ang | |

FOREIGN PATENT DOCUMENTS

| | | |
|---|---|---|
| JP | H01-014624 B2 | 3/1989 |
| JP | H10-149475 A | 6/1998 |
| JP | 2015-049874 A | 3/2015 |
| JP | 2015-055991 A | 3/2015 |

\* cited by examiner

| OPERATOR ID | MACHINE ID | BUNDLE ID OF ONE THOUSAND SHEETS | THE NUMBER OF BUNDLES OF ONE HUNDRED SHEETS | PROCESSING STATUS | DATE |
|---|---|---|---|---|---|
| ... | ... | ... | ... | ... | ... |
| **** | M001 | 0025 | k | PROCESSED | November 17, 2018, 13:29:00 |
| **** | M001 | 0026 | k | PROCESSED | November 17, 2018, 13:30:29 |
| **** | M002 | 0027 | k-1 | UNPROCESSED | November 17, 2018, 13:47:11 |
| ... | ... | ... | ... | ... | ... |

FIG. 12

APPARATUS AND METHOD FOR STACKING BANKNOTES, AND SYSTEM FOR PACKAGING BANKNOTES

CROSS-REFERENCE TO RELATED APPLICATION

This application is based upon and claims the benefit of priority from Japanese Patent Application No. 2017-005707, filed on Jan. 17, 2017; the entire contents of which are incorporated herein by reference.

FIELD

Embodiments described herein relate generally to an apparatus and a method for stacking banknotes, and a system for packaging banknotes.

BACKGROUND

In a bank which treats a large number of banknotes, a machine to automatically perform decision processing of banknotes (such as counting the banknotes) is utilized. In this apparatus, for example, as to banknotes to be circulated in a market, a predetermined number (such as one hundred sheets) of banknotes are strapped by a strapping material as one bundle of banknotes. Furthermore, a predetermined number of bundles of banknotes are bundled by a bundling material as one group of bundles (each bundle including banknotes). The group of bundles (of banknotes) is packaged by a vinyl and so on. As a result, the large number of banknotes is managed.

Conventionally, in order to confirm whether the packaged group of bundles (of banknotes) include a suitable number of banknotes, technique to detect the number of banknotes by using an optical detection device (such as a camera) is known. However, in this conventional technique, there are cases that accuracy to detect the number of banknotes is not sufficient.

DETAILED DESCRIPTION

According to one embodiment, a banknote stacking apparatus includes a first weight measurement part, a second weight measurement part, and a controller. The first weight measurement part measures a weight of a first banknote bundle. Banknotes laminated along a thickness direction of the banknotes are bundled as the first banknote bundle. The second weight measurement part measures a weight of a second banknote bundle. A first predetermined number of first banknote bundles laminated are bundled as the second banknote bundle. The controller compares the weight measured by the first weight measurement part with the weight measured by the second weight measurement part, and decides whether the number of first banknote bundles bundled as the second banknote bundle is smaller than the first predetermined number, based on a comparison result of the weight.

Hereinafter, a banknote stacking apparatus, a banknote packaging system and a banknote stacking method according to various embodiments will be described with reference to the accompanying drawings.

Figure 1:
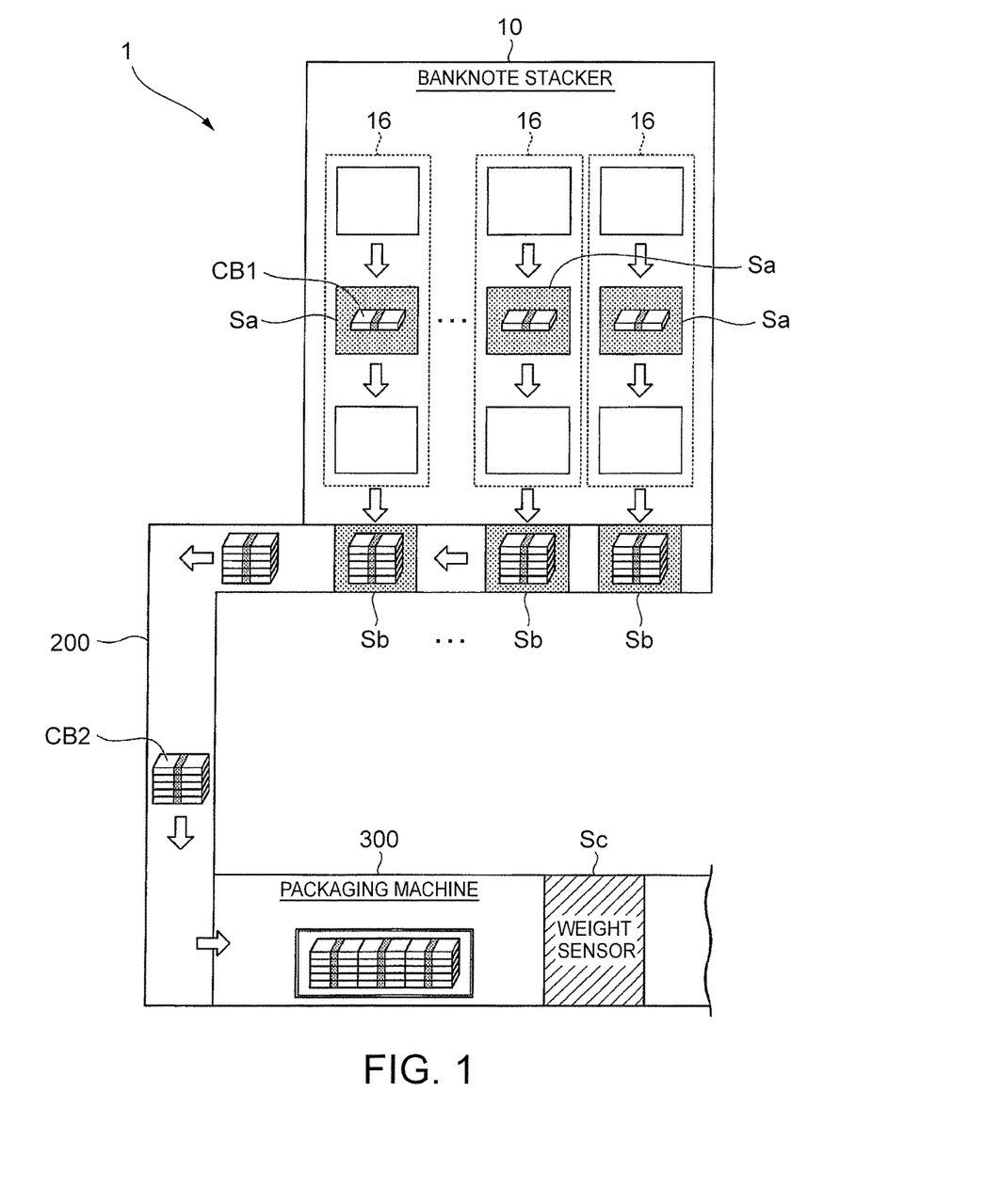
FIG. 1 is a schematic diagram showing one example of a banknote packaging system 1 including a banknote stacker 10 according to one embodiment.

FIG. 1 is a schematic diagram showing one example of a banknote packaging system 1 including a banknote stacker 10 according to one embodiment. For example, the banknote packaging system 1 equips the banknote stacker 10, a transport system 200 and a packaging machine 300. For example, the banknote stacker 10 counts and straps banknotes sent from each branch of a plurality of banks. Processing of the banknote stacker 10 is not limited to this. The banknote stacker 10 may regard arbitrary paper sheets (such as mail matter, various cards or tickets) capable to be bundled by a material as a processing target.

For example, in the banknote stacker 10, by stacking a predetermined number (e.g., one hundred sheets) of banknotes and by bundling them, one bundle of banknotes is created. Furthermore, by bundling a predetermined number (e.g., five or ten) of bundles (each bundle including the predetermined number of banknotes), one bundle (group) of the bundles is created. Hereinafter, the predetermined number of banknotes is one hundred, the predetermined number of bundles is ten (10), a bundle including the predetermined number of banknotes is called "a bundle CB1 of one hundred sheets (100 sheets)", and a bundle (group) including ten bundles (each bundle is the bundle CB1 of one hundred sheets) is called "a bundle CB2 of one thousand sheets (1000 sheets)". The number of bundles CB1 to be bundled as the bundle CB2 of one thousand sheets, i.e., the predetermined number of bundles is one example of "a first predetermined number". Furthermore, the bundle CB1 of one hundred sheets is one example of "a first bundle of banknotes", and the bundle CB2 of one thousand sheets is one example of "a second bundle of banknotes".

The banknote stacker 10 supplies the bundle CB2 of one thousand sheets (created thereby) to the transport system 200. In the banknote stacker 10, a first weight sensor Sa capable to measure a weight of the bundle CB1 of one hundred sheets, and a second weight sensor Sb capable to measure a weight of the bundle CB2 of one thousand sheets, are equipped. The first weight sensor Sa is one example of "a first weight measurement part", and the second weight sensor Sb is one example of "a second weight measurement part".

For example, the transport system 200 transports the bundle CB2 of one thousand sheets (bundled with a material by the banknote stacker 10) to the packaging machine 300 via a belt conveyer or a robot arm.

In the packaging machine 300, for example, by using a vinyl or a paper, a plurality of bundles CB2 of one thousand sheets (transported by the transport system 200) is bundled and packaged. The packaging machine 300 equips a third weight sensor Sc capable to measure a weight of the plurality of bundles CB2 of one thousand sheets (bundled and packaged thereby). The packaging machine 300 is one example of "a packaging part", and the third weight sensor Sc is one example of "a third weight measurement part".

Based on measurement results of the weight sensor equipped at each machine, any machine in the banknote packaging system 1 derives the number of bundles of banknotes and decides whether banknotes (at least one bundle) are missed on the way of transportation. Hereinafter, as one example, the banknote stacker 10 derives the number of bundles of banknotes and decides whether banknotes are missed on the way of transportation. However, these processing may be performed by the transport system 200 or the packaging machine 300.

[The banknote Stacker]

Figure 2:
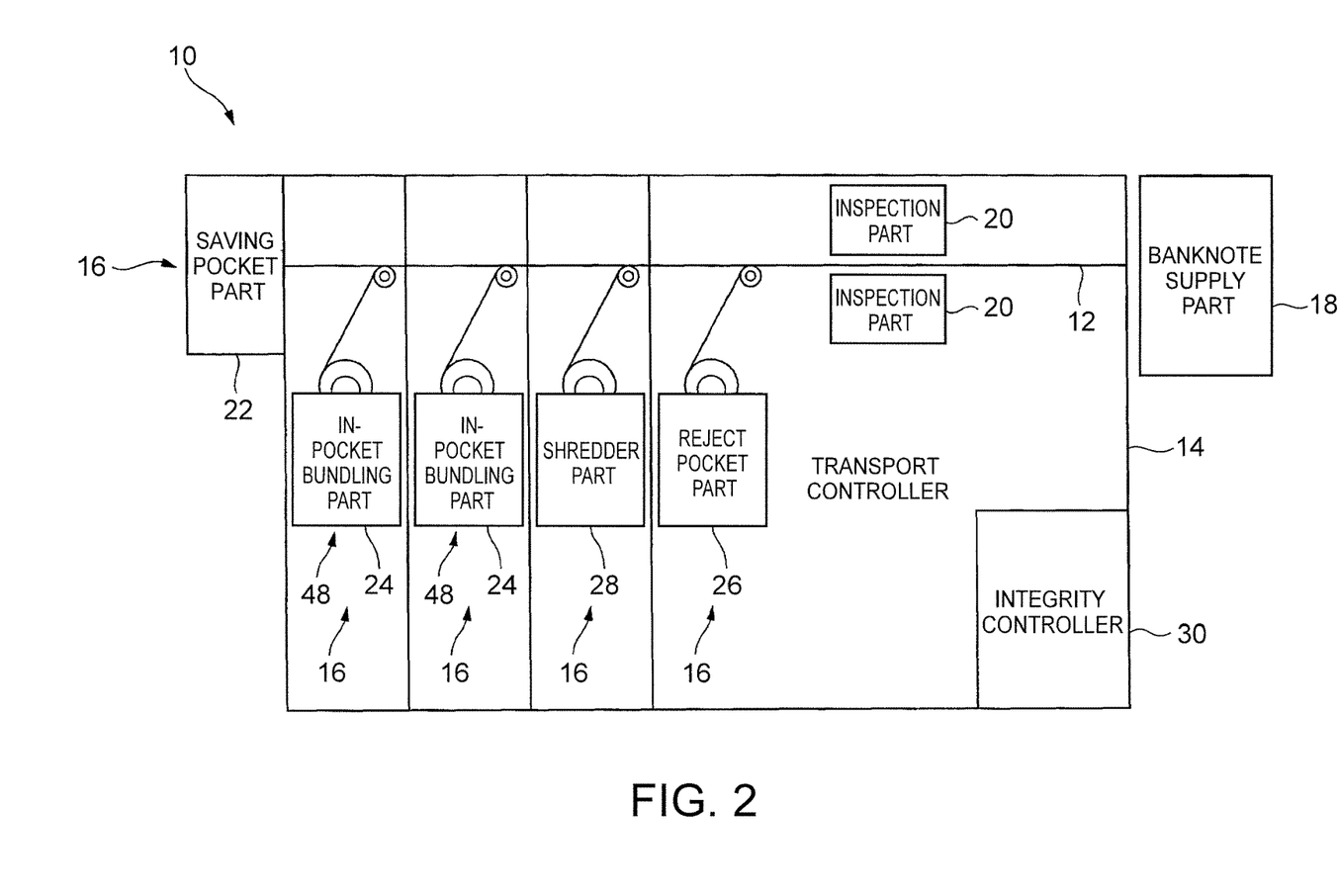
FIG. 2 is a schematic diagram showing one example of the banknote stacker 10 according to one embodiment.

FIG. 2 is a schematic diagram showing one example of the banknote stacker 10 according to one embodiment. For example, the banknote stacker 10 equips a transport path 12, a transport controller 14, a plurality of pocket parts 16, a banknote supply part 18, an inspection part 20, and an integrity controller 30.

A part or all of the transport controller 14, the plurality of pocket parts 16, the banknote supply part 18, the inspection part 20 and the integrity controller 30, maybe realized by executing a program stored in a program memory (not shown in FIG. 2) by a processor such as a CPU (Central Processing Unit) in a computer. Furthermore, these component elements may be realized by a hardware such as LSI (Large Scale Integration), ASIC (Application Specific Integrated Circuit), or FPGA (Field-Programming Gate Array). These component elements may be realized by cooperation of software and the hardware.

For example, the banknote supply part 18 stacks a plurality of banknotes at inner part therein, and supplies the stacked banknotes one by one to the transport controller 14. Here, the banknote supply part 18 may be an external device of the banknote stacker 10.

For example, by controlling a roller or an actuator to drive the roller (not shown in FIG. 2), the transport controller 14 captures the banknotes (supplied by the banknote supply part 18) one by one in order at a predetermined interval, and transports the captured banknotes to a side of the pocket part 16 along the transport path 12.

For example, the inspection part 20 is an optical detector such as an ultraviolet light detector, a fluorescence detector, or a phosphorescence detector. As shown in FIG. 2, for example, the inspection part 20 may be located so as to face mutually along the transport path 12, or may be located at only one of two positions facing mutually. For example, the inspection part 20 discriminates a kind of banknotes captured by the transport controller 14. As the kind of banknotes, for example, a counterfeit banknote, a damaged banknote, and a reusable banknote, are included. Then, the inspection part 20 counts the number of banknotes for each kind of banknotes discriminated. The inspection part 20 outputs the discrimination result and the counting result to the integrity controller 30.

As a plurality of pocket parts 16, for example, a saving pocket part 22, a reject pocket part 26, a shredder part 28, and one or a plurality of in-pocket bundler 48 (two in-pocket bundlers in FIG. 2), are equipped. In the saving pocket part 22, banknotes not transported to other pocket parts (e.g., banknotes discriminated as an error by the inspection part 20) are transported and stacked.

In the reject pocket part 26, for example, banknotes discriminated as counterfeit banknotes by the inspection part 20 are transported and stacked. In the shredder part 28, for example, banknotes discriminated as damaged banknotes by the inspection part 20 are transported. The shredder part 28 cuts the banknotes transported.

In one of a plurality of in-pocket bundlers 48, for example, reusable banknotes are transported and stacked. Each of the in-pocket bundlers 48 stacks the banknotes transported (i.e., reusable banknotes), and creates the bundle CB1 of one hundred sheets and the bundle CB2 of one thousand sheets.

The integrity controller 30 controls each part in the banknote stacker 10. For example, by referring to the discrimination result by the inspection part 20, the integrity controller 30 controls the transport controller 14 to transport banknotes (passed through the inspection part 20) into each pocket part 16 corresponding to a kind of the banknote. Then, the integrity controller 30 makes each pocket part 16 discharge the banknotes (stacked in each pocket part 16) to the outside of the banknote stacker 10.

Furthermore, the integrity controller 30 acquires respective measurement results from the first weight sensor Sa, the second weight sensor Sb and the third weight sensor Sc, and derives the number of bundles of banknotes based on the respective measurement results. Then, the integrity controller 30 decides whether the banknotes (at least one bundle) are missed on the way of transportation.

Figure 3:
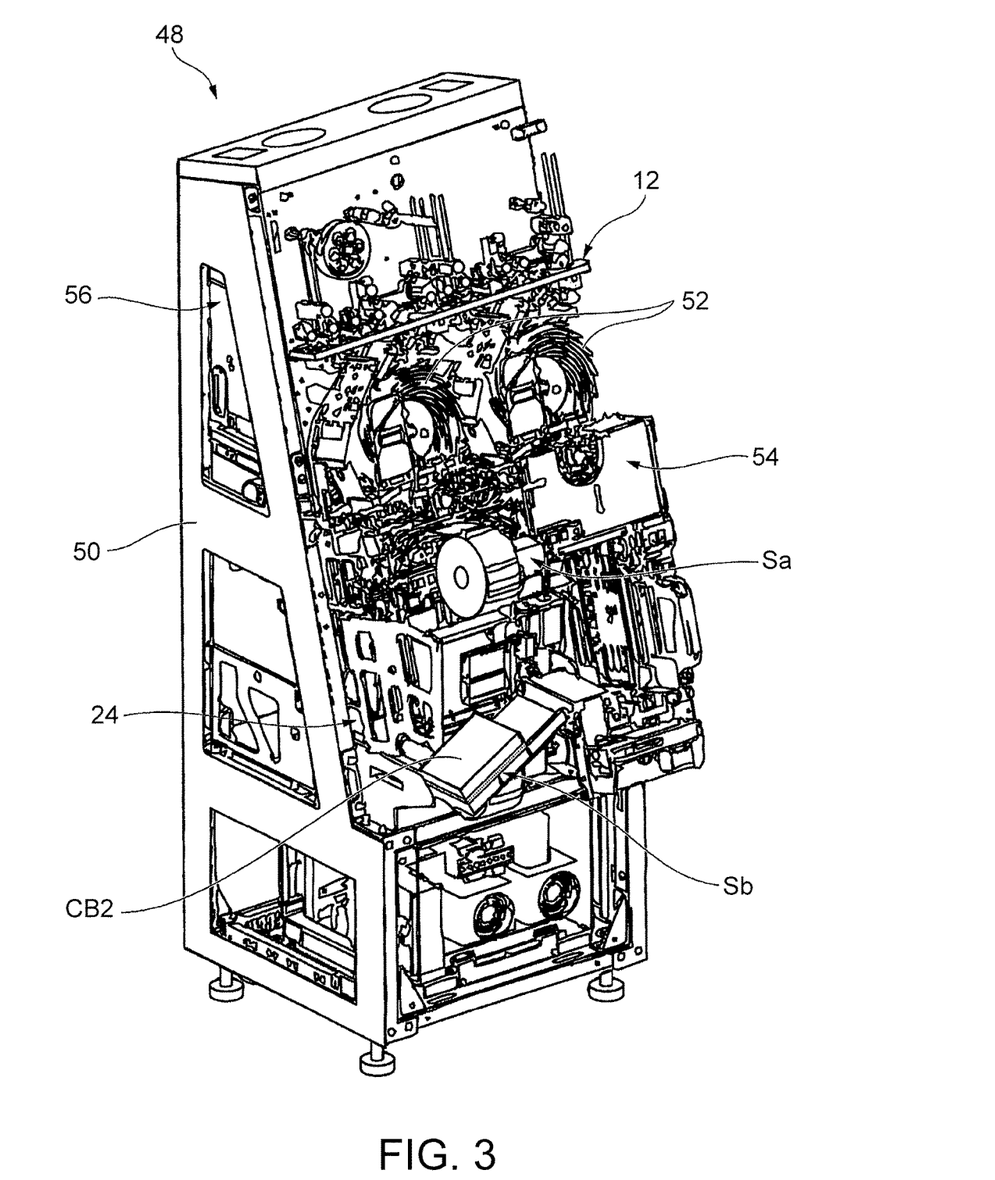
FIG. 3 is a schematic diagram showing one example of an in-pocket bundler 48 in the banknote stacker 10.
Figure 4:
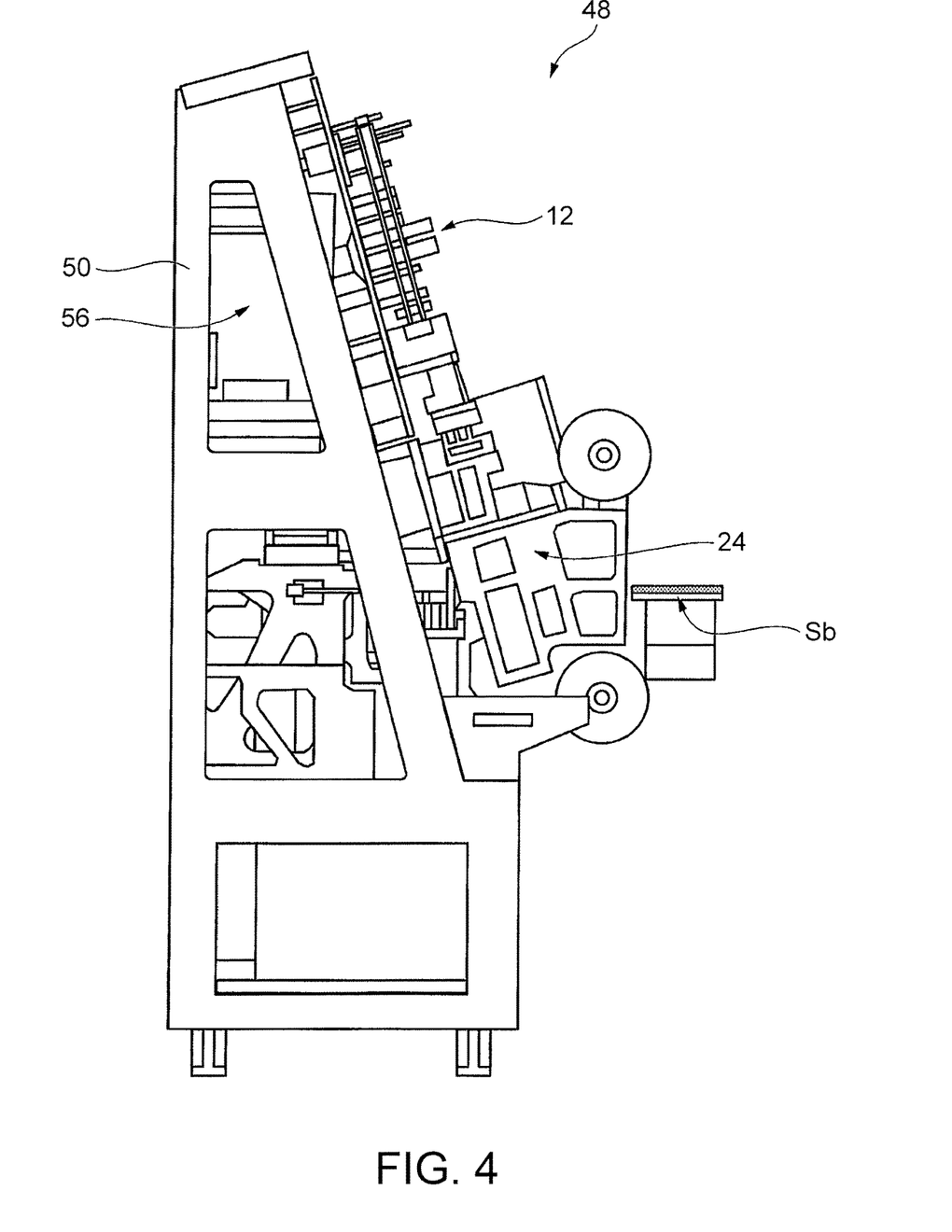
FIG. 4 is a schematic diagram showing another example of the in-pocket bundler 48 in the banknote stacker 10.

FIGS. 3 and 4 are schematic diagrams showing one example of the in-pocket bundler 48. For example, the in-pocket bundler 48 equips the transport path 12, the in-pocket bundling part 24, the first weight sensor Sa, the second weight sensor Sb, an in-bundler feeder 52, a stacking part 54 and a driving controller 56, in a housing 50.

For example, at one end of the transport path in FIG. 3, banknotes passed through the inspection part 20 are supplied. The banknotes supplied from one end of the transport path 12 are transported toward the other end thereof. The in-bundler feeder 52 captures the banknotes (supplied from one end to the other end of the transport path 12) one by one, and supplies them to the stacking part 54. For example, the in-bundler feeder 52 is an impeller to accommodate each banknote into a gap between two neighboring blades of the impeller. By rotating the impeller, the in-bundler feeder 52 transports the banknotes (accommodated into the gap between two neighboring blades) to the stacking part 54.

The stacking part 54 laminates banknotes (supplied by the in-bundler feeder 52) along the thickness direction of the banknotes. Then, by strapping the banknotes (laminated every one hundred sheets) with a trapping material Ba, the stacking part 54 creates a bundle CB1 of one hundred sheets. Then, the stacking part 54 transports the bundle CB1 of one hundred sheets to the in-pocket bundling part 24. Here, creation of the bundle CB1 of one hundred sheets may be performed by the in-pocket bundling part 24 in place of the stacking part 54.

For example, the first weight sensor Sa is located at a middle point of the transport path (not shown in FIGS. 3 and 4) to transport the bundle CB1 of one hundred sheets from the stacking part 54 to the in-pocket bundling part 24, and measures a weight wk of the bundle CB1 of one hundred sheets (being transported). Here, k represents a natural number within a range from one (1) to the number (predetermined number) of the bundle CB1 of one hundred sheets (to be strapped for creating the bundle CB2 of one thousand sheets). For example, if the bundle CB2 of one thousand sheets is created by strapping ten bundles of the bundle CB1 of one hundred sheets, whenever each of ten bundles (of the bundle CB1 of one hundred sheets) passes on the first weight sensor Sa, the first weight sensor Sa measures a weight wk (w1, w2, . . . , w10) of each bundle CB1 of one hundred sheets. The first weight sensor Sa outputs the first weight information related to the weight wk (measured for each bundle CB1 of one hundred sheets) to the integrity controller 30.

The in-pocket bundling part 24 accepts the bundle CB1 of one hundred sheets created by the stacking part 24. When the number of bundles CB1 of one hundred sheets (accepted) reaches ten (10), the in-pocket bundling part 24 creates the bundle CB2 of one thousand sheets by strapping ten bundles of the bundle CB1 of one hundred sheets. The in-pocket bundling part 24 transports the bundle CB2 of one thousand sheets (created) to the transport system 200.

For example, the second weight sensor Sb is located at a middle point of the transport path (not shown in FIGS. 3 and 4) to transport the bundle CB2 of one thousand sheets from the in-pocket bundling part 24 to the transport system 200, and measures a weight Wa of the bundle CB2 of one thousand sheets (being transported). The second weight sensor Sb outputs the second weight information related to the weight Wa (measured for the bundle CB2) to the integrity controller 30.

In response to a control by the integrity controller 30, the driving controller 56 controls a driving part (such as a motor or a solenoid) to drive a transport mechanism of the transport path 12, and transports banknotes on the transport path 12. Furthermore, in response to the control by the integrity controller 30, the driving controller 56 controls the in-bundler feeder 52 to capture banknotes transported on the transport path 12.

Figure 5:
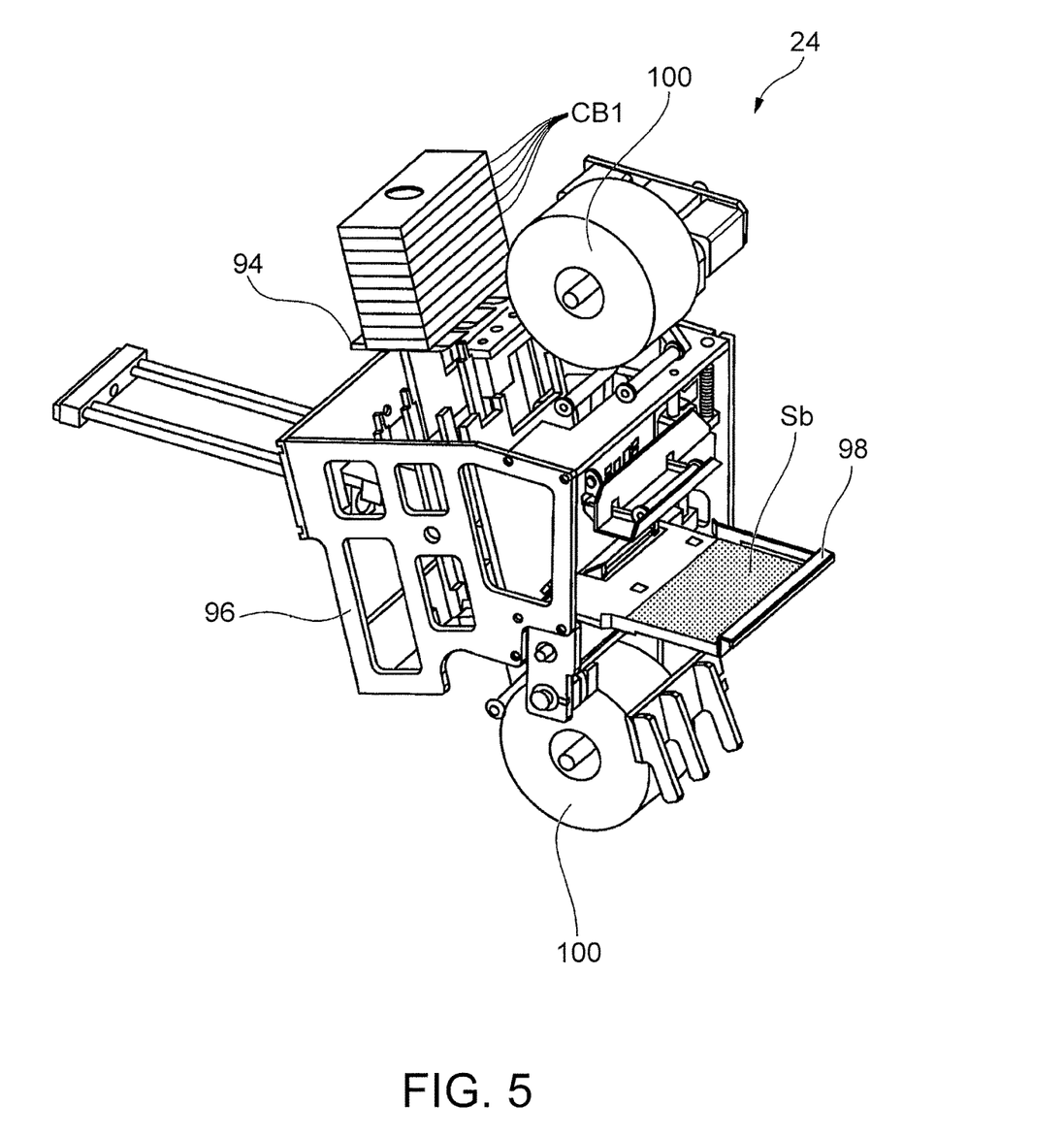
FIG. 5 is a schematic diagram showing one example of an in-pocket bundling part 24 in the in-pocket bundler 48.

FIG. 5 is a schematic diagram showing one example of the in-pocket bundling part 24. As shown in FIG. 5, for example, the in-pocket bundling part 24 equips a platform 94, an outer frame 96, a discharge tray 98, and two spools 100. On the platform 94, a plurality of bundles CB1 of one hundred sheets (created by the stacking part 54) is accommodated by being piled up.

The outer frame 96 makes the housing 50 connect with the in-pocket bundling part 24, or makes the housing 50 connect with a member of the in-pocket bundling part 24 having another mechanical support function.

On the discharge tray 98, the bundle CB2 of one thousand sheets (created by the in-pocket bundling part 24) is loaded. The bundle CB2 of one thousand sheets (loaded on the discharge tray 98) is discharged to the transport system 200. For example, the second weight sensor Sb is attached to a side face (Hereinafter, it is called "a loading face") of the discharge tray 98 on which the bundle CB2 of one thousand sheets is loaded. As a result, at timing when the bundle CB2 of one thousand sheets is loaded on the discharge tray 98, the weight Wa of the bundle CB2 of one thousand sheets is measured.

Two spools 100 hold a bundling material Bb to strap ten bundles of the bundle CB1 of one hundred sheets (stacked on the platform 94). For example, the bundling material Bb is a ribbon laminated cylindrically.

Figure 6A:
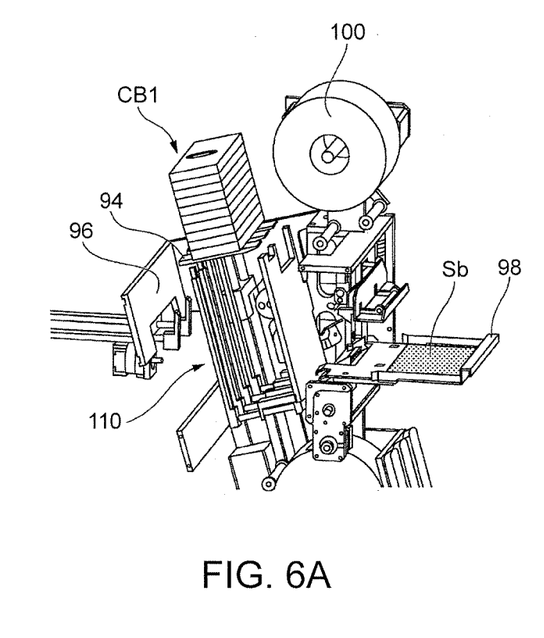
FIGS. 6A and 6B are schematic diagrams showing situation that a bundle CB1 of one hundred sheets accommodated onto platform 94 in the in-pocket bundling part 24.
Figure 6B:
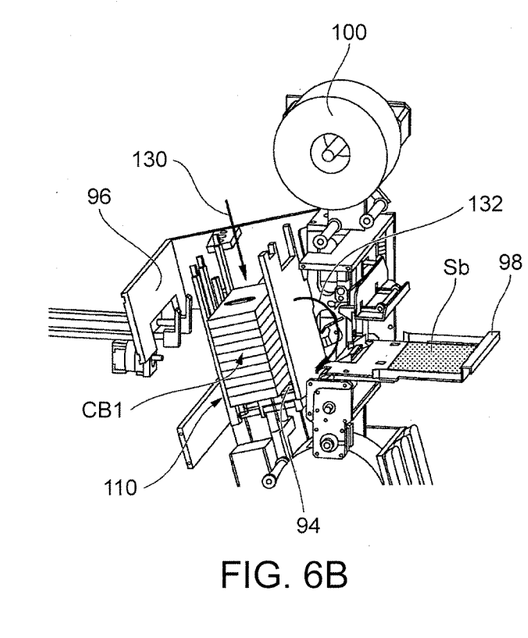

FIGS. 6A and 6B are schematic diagrams showing situation that the bundle CB1 of one hundred sheets accommodated onto the platform 94. The in-pocket bundling part 24, in addition to above-mentioned component, further equips a container 110 accommodating the platform 94 capable to pile up ten bundles of the bundle CB1 of one hundred sheets. As shown in FIG. 6B, when a plurality of bundles CB1 (e.g., ten bundles) of one hundred sheets is piled up on the platform 94, the platform 94 moves along an arrow direction 130 in the container 110. When ten bundles of the bundle CB1 of one hundred sheets are accommodated in the container 110, the container 110 rotates along an arrow direction 132 shown in FIG. 6B, and discharges ten bundles of the bundle CB1 of one hundred sheets (positioned in the container 110) to the discharge tray 98. When ten bundles of the bundle CB1 of one hundred sheets are discharged from the container 110 (rotated) to the discharge tray 98, the in-pocket bundling part 24 straps ten bundles of the bundle CB1 of one hundred sheets by winding the bundling material Bb (held in the spool 100) around ten bundles of the bundle CB1 of one hundred sheets (loaded on the platform 94). As a result, the bundle CB2 of one thousand sheets is created.

[Processing Flow of the Banknote Packaging System 1]

Figure 7:
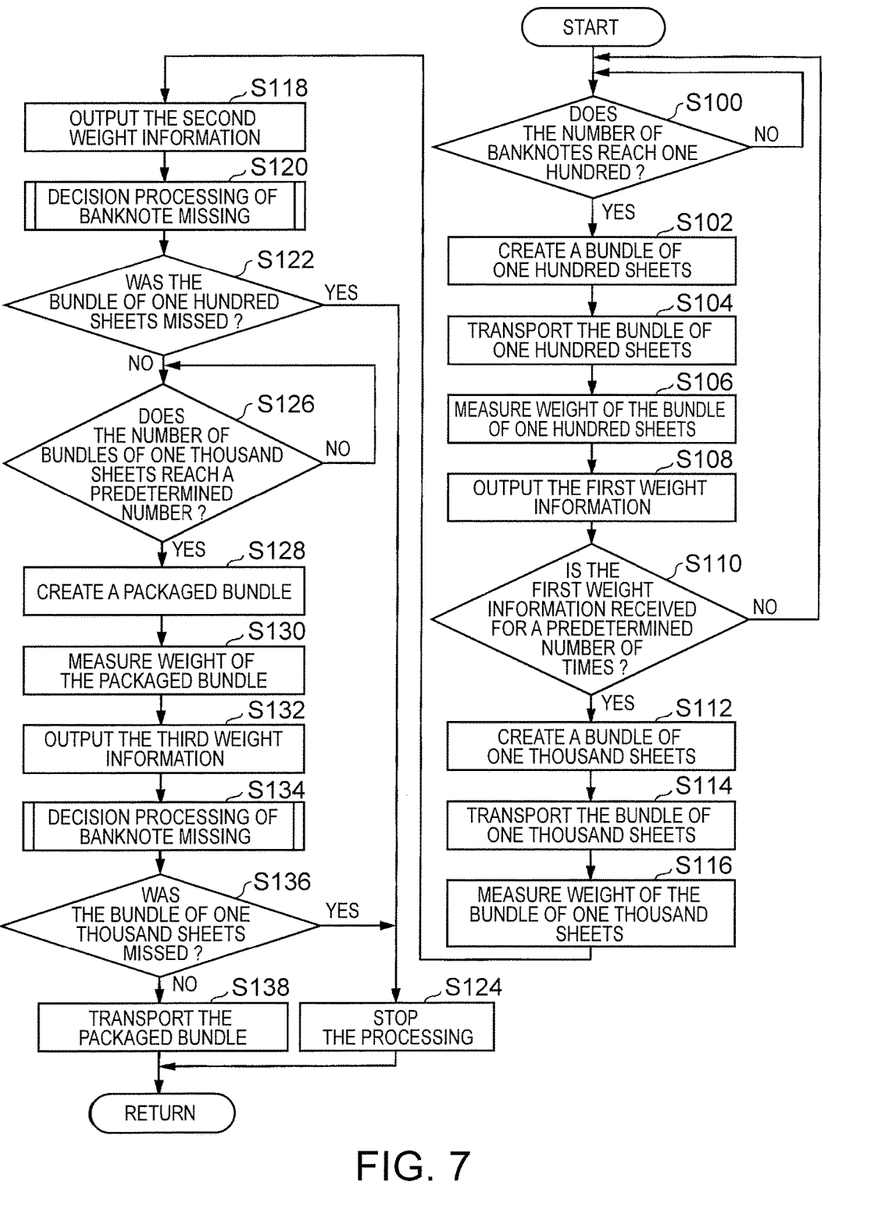
FIG. 7 is a flow chart showing one example of processing by the banknote packaging system 1 according to one embodiment.

Hereinafter, a series of processing by the banknote packaging system 1 will be explained. FIG. 7 is a flow chart showing one example of the processing by the banknote packaging system 1. For example, when banknotes are captured from the banknote supply part 18 by the banknote stacker 10, processing of this flow chart starts to execute.

First, by referring to the discrimination result and the counting result (acquired from the inspection part 20), the integrity controller 30 (in the banknote stacker 10) waits until the number of banknotes (discriminated as reusable banknotes by the inspection part 20) reaches one hundred (S100). When the number of reusable banknotes reaches one hundred, the integrity controller 30 sends a control indication for creating a bundle CB1 of one hundred sheets to the stacking part 54 of the in-pocket bundler 48. As a result, by strapping every one hundred banknotes with a strapping material Ba, the stacking part 54 creates the bundle CB1 of one hundred sheets (S102). Then, the integrity controller 30 sends a control indication for transporting a bundle CB1 of one hundred sheets to the stacking part 54, and makes stacking part 54 transport the bundle CB1 of one hundred sheets (created thereby) to the in-pocket bundling part 24 (S104).

Next, on the transport path to transport the bundle CB1 of one hundred sheets from the stacking part 54 to the in-pocket bundling part 24, the first weight sensor Sa measures a weight wk of the bundle CB1 of one hundred sheets (S106), and outputs the first weight information as the measurement result to the integrity controller 30 (S108).

Next, the integrity controller 30 decides whether the first weight information is received for a predetermined number of times from the first weight sensor Sa (S110). In the present embodiment, the bundle CB2 of one thousand sheets is created from ten bundles of the bundle CB1 of one hundred sheets. Accordingly, the predetermined number of times is set to ten (10).

When the first weight information is not received for the predetermined number of times from the first weight sensor Sa, the integrity controller 30 returns above-mentioned processing of S100. On the other hand, when the first weight information is received for the predetermined number of times from the first weight sensor Sa, the integrity controller 30 sends a control indication for creating a bundle CB2 of one thousand sheets to the in-pocket bundling part 24 of the in-pocket bundler 48. As a result, by strapping every ten bundles of the bundle CB1 of one hundred sheets with a bundling material Bb, the in-pocket bundling part 24 creates the bundle CB2 of one hundred sheets (S112). Then, the integrity controller 30 sends a control indication for transporting the bundle CB2 of one thousand sheets to the in-pocket bundling part 24, and makes in-pocket bundling part 24 transport the bundle CB2 of one thousand sheets (loaded on the discharge tray 98) to the transport system 200 (S114).

Next, the second weight sensor Sb measures a weight Wa of the bundle CB2 of one thousand sheets loaded on the discharge tray 98 (S116), and outputs the second weight information as the measurement result to the integrity controller 30 (S118).

Next, based on the first weight information (output at processing of S108) and the second weight information (output at processing of S118), the integrity controller 30 decides whether at least one bundle (banknotes) of one hundred sheets has missed (S120). This decision processing of banknote missing will be explained by using another flow chart.

As a result of the decision processing of banknote missing, the integrity controller 30 decides whether to acquire a decision result that at least one bundle (of one hundred sheets) has missed (S122). If the decision result that at least one bundle (of one hundred sheets) has missed is acquired, the integrity controller 30 stops processing (e.g., creating the bundle CB2 of one thousand sheets by the in-pocket bundling part 24) of the banknote packaging system 1 (S124).

On the other hand, if the decision result that no bundles (of one hundred sheets) have missed is acquired, the packaging machine 300 counts the number of bundles CB2 of one thousand sheets transported by the transport system 200, and waits until the number of bundles CB2 reaches a predetermined number (e.g., five or ten) (S126). When the number of bundles CB2 of one thousand sheets reaches the predetermined number, the packaging machine 300 creates a packaged bundle by bundling and packaging the predetermined number of bundles CB2 of one thousand sheets (S128). The predetermined number is one example of "second predetermined number".

Next, the third weight sensor Sc measures a weight Wb of the packaged bundle created by the packaging machine 300 (S130), and outputs the third weight information as the measurement result to the integrity controller 30 (S132).

Next, based on the second weight information (output at processing of S118) and the third weight information (output at processing of S134), the integrity controller 30 decides whether at least one bundle (banknotes) of one thousand sheets has missed (S134).

As a result of the decision processing of banknote missing, the integrity controller 30 decides whether to acquire a decision result that at least one bundle (of one thousand sheets) has missed (S136). If the decision result that at least one bundle (of one thousand sheets) has missed is acquired, the integrity controller 30 forwards to above-mentioned processing of S124, and stops processing (e.g., packaging the predetermined number of bundles CB2 of one thousand sheets by the packaging machine 300) of the banknote packaging system 1.

On the other hand, if the decision result that no bundles (of one thousand sheets) have missed is acquired, the packaging machine 300 transports the packaged bundle (created thereby) to a labeler (not shown in FIG. 1) and so on (S138). For example, the labeler is a device to assign a label representing various kinds of information (such as a date, a kind of the banknotes) to the packaged bundle. As a result, processing of the flow chart of FIG. 7 is completed.

Figure 8:
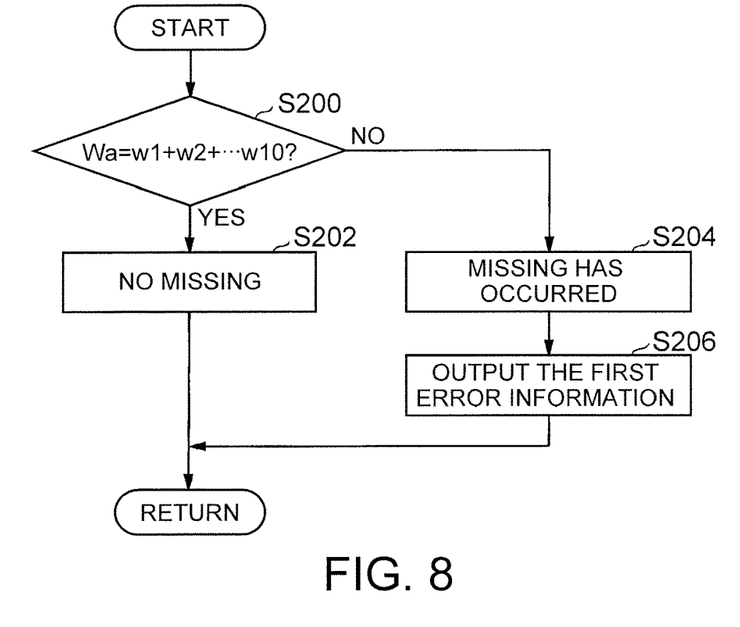
FIG. 8 is a flowchart showing one example of decision processing of banknote missing by an integrity controller 30 at S122 in FIG. 7.

FIG. 8 is a flow chart showing one example of the decision processing of banknote missing by the integrity controller 30 at S122 in FIG. 7. First, at timing when the first weight information is received for the predetermined number of times, the integrity controller 30 compares a sum $\{w1+w2+ \ldots +w10\}$ of the weight wk of the bundle CB1 of one hundred sheets (represented by each of the first weight information) with the weight Wa of the bundle CB2 of one thousand sheets (represented by the second weight information), and decides whether the Wa is same level as the sum $\{w1+w2+ \ldots +w10\}$ (S200). The same level weight means that, for example, an error of several grams unit (e.g., an error of weight of the strapping material Ba, the bundling material Bb) is allowable.

For example, if the Wa of the bundle CB2 of one thousand sheets is same level as the sum $\{w1+w2+ \ldots +w10\}$ of the weight wk of the bundle CB1 of one hundred sheets, the integrity controller 30 decides that the number of bundles CB1 of one hundred sheets (bundled as the bundle CB2 of one thousand sheets) is equal to ten (i.e., the predetermined number k). Then, the integrity controller 30 decides that no bundles CB1 of one hundred sheets have not missed in the transport path from a position where the first weight sensor Sa is located to a position where the second weight sensor Sb is located (S202).

On the other hand, if the Wa of the bundle CB2 of one thousand sheets is not same level as the sum $\{w1+w2+ \ldots +w10\}$ of the weight wk of the bundle CB1 of one hundred sheets, the integrity controller 30 decides that the number of bundles CB1 of one hundred sheets (bundled as the bundle CB2 of one thousand sheets) is smaller than ten (i.e., the predetermined number k). Then, the integrity controller 30 decides that at least one bundle CB1 of one hundred sheets has missed in the transport path from the position where the first weight sensor Sa is located to the position where the second weight sensor Sb is located (S204).

For example, while the bundle CB1 of one hundred sheets is being transported from the stacking part 54 to the in-pocket bundling part 24, due to mechanical handling (position adjustment), there are cases when the bundle CB1 of one hundred sheets (to be piled on the platform 94 of the in-pocket bundling part 24) is fallen into an inner gap of the in-pocket bundling part 24. As a result, the weight Wa of the bundle CB2 of one thousand sheets is lighter by a weight of the bundle CB1 fallen into the inner gap, and it is erroneously decided that missing of banknotes (bundle) has occurred.

Furthermore, there are cases when a paper jam occurs in the stacking part 54, in the transport path to transport the bundle CB1 of one hundred sheets from the stacking part 54 to the in-pocket bundling part 24, or in the in-pocket bundling part. In order to resolve the paper jam, there are cases that an operator removes the bundle CB1 jammed. In this case, if new bundle CB1 of one hundred sheets is not set in place of the bundle CB1 jammed, the weight Wa of the bundle CB2 of one thousand sheets is lighter by a weight of the bundle CB1 removed, and it is erroneously decided that missing of banknotes (bundle) has occurred.

In this way, due to mechanical error or artificial error, the integrity controller 30 can detect that the number of bundles CB1 is smaller or larger than the desired number of bundles CB1.

Next, the integrity controller 30 outputs the first error information to a display device visible for the operator (S206). The first error information represents that missing of banknotes (bundle) has occurred in the transport path from a position where the first weight sensor Sa is located to a position where the second weight sensor Sb is located. The display device is, for example, a LCD (Liquid Crystal Display) or an organic EL (Electroluminescence) display.

Figure 9:
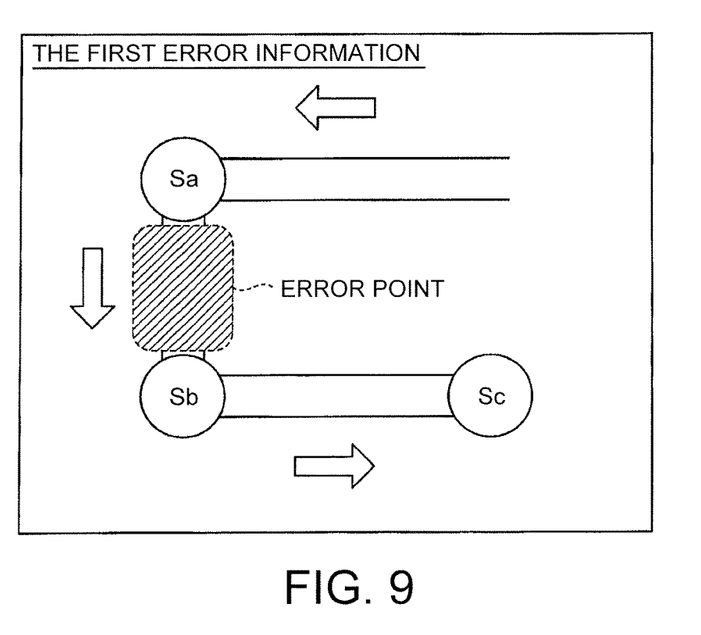
FIG. 9 is one example showing a display on which the first error information is displayed.

FIG. 9 is one example showing a display on which the first error information is displayed. As shown in FIG. 9, the display device (which receives the first error information) displays a division (where missing of banknotes has occurred) as an error point on the transport path divided by positions at which each weight sensor is located. As a result, the operator can understand where the error has occurred.

Figure 10:
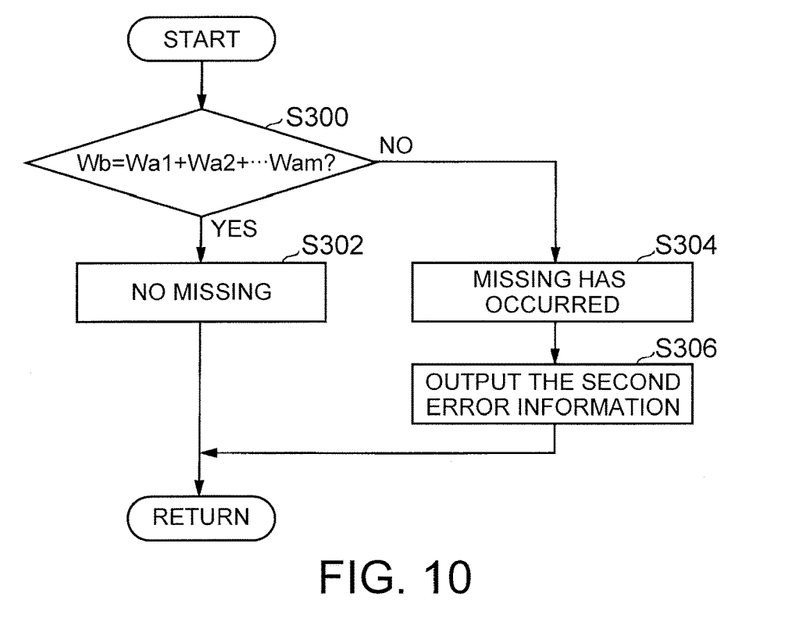
FIG. 10 is a flowchart showing one example of decision processing of banknote missing by an integrity controller 30 at S136 in FIG. 7.

FIG. 10 is a flow chart showing one example of the decision processing of banknote missing by the integrity controller 30 at S136 in FIG. 7. First, at timing when the number of bundles CB2 of one thousand sheets reaches the predetermined number, the integrity controller 30 compares a sum {Wa1+Wa2+ . . . +Wam} of the weight Wa of the bundle CB2 of one thousand sheets (represented by each of the second weight information) with the weight Wb of the packaged bundle (represented by the third weight information), and decides whether the Wb is same level as the sum {Wa1+Wa2+ . . . +Wam} (S300).

For example, if the Wb of the packaged bundle is same level as the sum {Wa1+Wa2+ . . . +Wam} of the weight Wa of the bundle CB2 of one thousand sheets, the integrity controller 30 decides that the number of bundles CB2 of one thousand sheets (bundled as the packaged bundle) is equal to the predetermined number m. Then, the integrity controller 30 decides that no bundles CB2 of one thousand sheets have not missed in the transport path from a position where the second weight sensor Sb is located to a position where the third weight sensor Sc is located (S302).

On the other hand, if the Wb of the packaged bundle is not same level as the sum {Wa1+Wa2+ . . . +Wam} of the weight Wa of the bundle CB2 of one thousand sheets, the integrity controller 30 decides that the number of bundles CB2 of one thousand sheets (bundled as the packaged bundle) is smaller than the predetermined number m. Then, the integrity controller 30 decides that at least one bundle CB2 of one thousand sheets has missed in the transport path from the position where the second weight sensor Sb is located to the position where the third weight sensor Sc is located (S304).

For example, while the bundle CB2 of one thousand sheets is being transported from the in-pocket bundling part 24 of the banknote stacker 10, due to mechanical error or artificial error, there are cases when the bundle CB2 of one thousand sheets is lost in the transport system. As a result, the weight Wb of the packaged bundle is lighter by a weight of the bundle CB2 lost, and it is erroneously decided that missing of banknotes (bundle) has occurred.

Next, the integrity controller 30 outputs the second error information to the display device visible for the operator (S306). The second error information represents that missing of banknotes (bundle) has occurred in the transport path from a position where the second weight sensor Sb is located to a position where the third weight sensor Sc is located.

Figure 11:
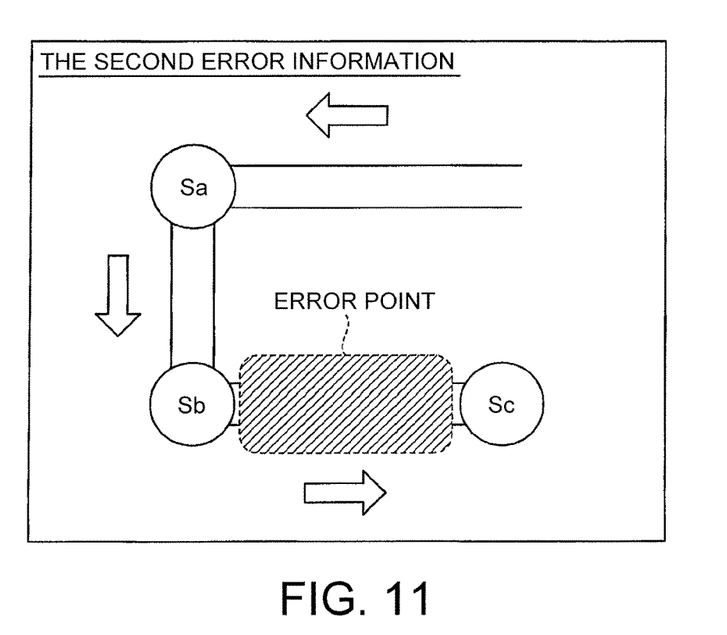
FIG. 11 is one example showing a display on which the second error information is displayed.

FIG. 11 is one example showing a display on which the second error information is displayed. In the same way as FIG. 9, the display device (which receives the second error information) displays a division (where missing of banknotes has occurred) as an error point on the transport path divided by positions at which each weight sensor is located.

Furthermore, with the first error information and the second error information, the integrity controller 30 may output log information when missing of banknotes has occurred to the external device.

Figure 12:
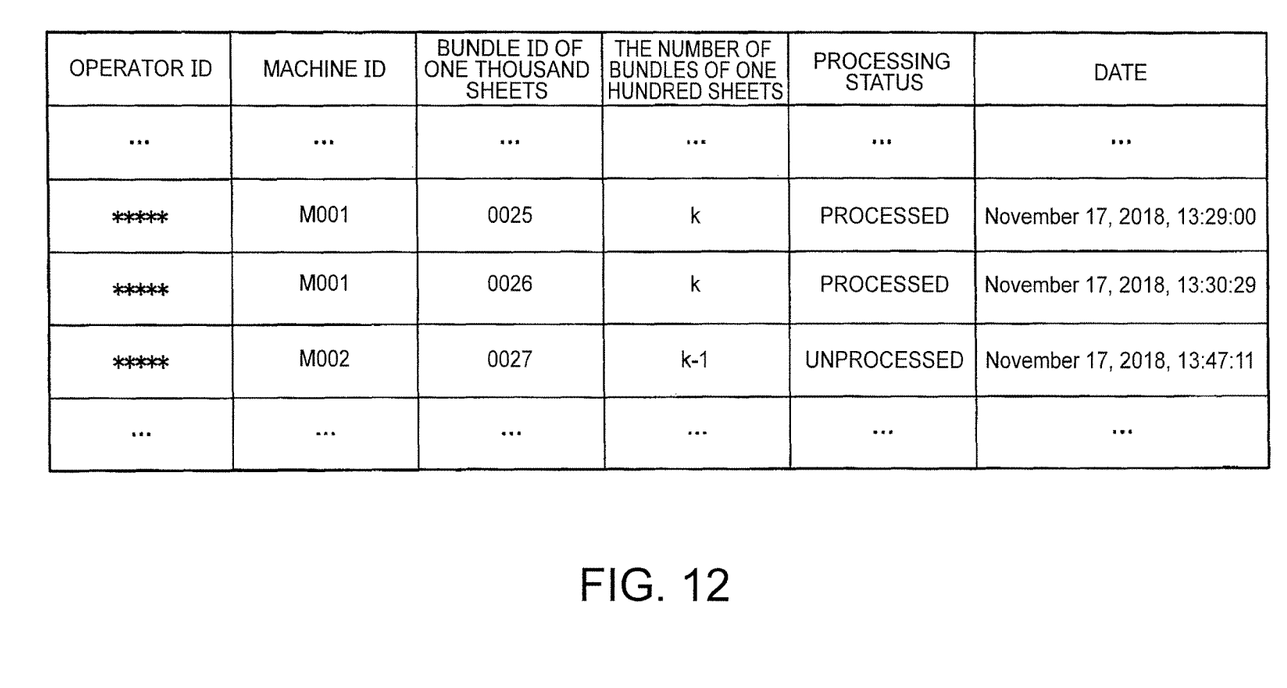
FIG. 12 is one example showing log information outputted by the integrity controller 30.

FIG. 12 is one example showing log information outputted by the integrity controller 30. As shown in FIG. 12, for example, the log information correspondingly includes an operator ID, a machine ID, a bundle ID of one thousand sheets, the number of bundles CB1 of one hundred sheets, a processing status, a date when the processing is performed. For example, the operator ID is identification information of an operator who operates each machine such as the banknote stacker 10. The machine ID is identification information of the banknote stacker 10, the transport system 200, and the packaging machine 300. The bundle ID of one thousand sheets is identification information of the bundle CB2 of one thousand sheets. The number of bundles CB1 of one hundred sheets represents the number of bundles CB1 included in the bundle CB2 of one thousand sheets. If the decision processing of banknote missing is not performed, this number is a predetermined number k. The processing status includes, for example, a status (processed) representing that the packaged bundle is created without missing of banknotes, and a status (unprocessed) representing that the processing is stopped due to missing of banknotes occurred in any path. By outputting this log information, for example, a tendency which error occurs for each operator or each machine can be grasped.

Moreover, in above-mentioned embodiment, the second weight sensor Sb is located at the discharge tray 98. However, a position of the second weight sensor Sb is not limited to this. The second weight sensor Sb may be located in the transport path from a position where the bundle CB2 of one thousand sheets is created to a position where the packaged bundle is created. For example, the second weight sensor Sb maybe located at a transport path not shown in the transport system 200.

According to above-mentioned embodiment, the first weight sensor Sa, the second weight sensor Sb, and the integrity controller 30, are equipped. The first weight sensor Sa measures a weight of the bundle CB1 (first banknote bundle) of one hundred sheets (banknotes are laminated along the thickness direction and bundled). The second weight sensor Sb measures a weight of the bundle CB2 (second banknote bundle) of one thousand sheets (ten bundles (first predetermined number) of the bundle CB1 of one hundred sheets are laminated and bundled). The integrity controller compares the weight measured by the first weight sensor Sa with the weight measured by the second weight sensor Sb, and decides whether the number of bundles CB1 of one hundred sheets (bundled as the bundle CB2 of one thousand sheets) is smaller than ten (10). As a result, the number of bundles CB1 included in the bundle CB2 of one thousand sheets can be detected with high accuracy.

In general, by previously acquiring an average (as a reference value) of weights of a plurality of bundles CB1 of one hundred sheets, during the process stage, by comparing the reference value with the weight of the bundle CB2 of one thousand sheets (actually created), it is thought that the number of bundles CB1 is detected. In this case, the weight of banknotes increases or decreases due to an influence of the humidity and so on. Accordingly, there are cases when an error between the reference value and the weight of the bundle CB2 becomes large. As a result, accuracy to detect the number of bundles of banknotes is degraded.

Contrary to this, in the present embodiment, by comparing the weight of the bundle CB1 of one hundred sheets (measured in a series of the process stage until the packaged bundle is created) with the weight of the bundle CB2 of one thousand sheets, it is decided whether the number of bundles CB1 of one hundred sheets (bundled as the bundle CB2 of one thousand sheets) is smaller than the predetermined number k. Accordingly, for example, even if the weight of banknotes increases or decreases due to an influence of the humidity and so on, both the weight of the bundle CB1 of one hundred sheets and the weight of the bundle CB2 of one thousand sheets increase or decrease with the same tendency. As a result, without an influence of the error due to an environmental factor, the number of bundles of banknotes can be detected with high accuracy.

Furthermore, for example, when the number of bundles CB2 of one thousand sheets is detected by using an optical detection device (such as a camera), there are cases when accuracy to detect the number of bundles of banknotes is degraded due to a color of the bundling material Bb used for creating the bundle CB2 of one thousand sheets. Contrary to this, in the present embodiment, by comparing the respective weights mutually, in comparison with detection by above-mentioned optical detection device, the number of bundles of banknotes can be detected with high accuracy.

According to at least one of above-mentioned embodiments, the first weight sensor Sa, the second weight sensor Sb, and the integrity controller 30, are equipped. The first weight sensor Sa measures a weight of the bundle CB1 (first banknote bundle) of one hundred sheets (banknotes are laminated along the thickness direction and bundled). The second weight sensor Sb measures a weight of the bundle CB2 (second banknote bundle) of one thousand sheets (ten bundles (first predetermined number) of the bundle CB1 of one hundred sheets are laminated and bundled). The integrity controller compares the weight measured by the first weight sensor Sa with the weight measured by the second weight sensor Sb, and decides whether the number of bundles CB1 of one hundred sheets (bundled as the bundle CB2 of one thousand sheets) is smaller than ten (10). As a result, the number of bundles CB1 included in the bundle CB2 of one thousand sheets can be detected with high accuracy.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for stacking banknotes, comprising:
a first weight measurement part that measures a weight of a first banknote bundle, banknotes laminated along a thickness direction of the banknotes being bundled as the first banknote bundle;
a second weight measurement part that measures a weight of a second banknote bundle, a first predetermined number of first banknote bundles laminated being bundled as the second banknote bundle; and
a controller that compares the weight measured by the first weight measurement part with the weight measured by the second weight measurement part, and decides whether the number of first banknote bundles bundled as the second banknote bundle is smaller than the first predetermined number, based on a comparison result of the weight, wherein
the first weight measurement part measures a weight of each of the first predetermined number of first banknote bundles, and
if a sum of the weight of each of the first predetermined number of first banknote bundles is not same level as the weight of the second banknote bundle, the controller decides that the number of first banknote bundles bundled as the second banknote bundle is smaller than the first predetermined number.

2. The apparatus according to claim 1, wherein
if the number of first banknote bundles bundled as the second banknote bundle is smaller than the first predetermined number, the controller makes a display device output an error information representing that missing of the first banknote bundle has occurred.

3. The apparatus according to claim 1, further comprising:
a bundling part that creates the second banknote bundle by bundling the first predetermined number of first banknote bundles;
wherein, if the number of first banknote bundles bundled as the second banknote bundle is smaller than the first predetermined number, the controller makes the bundling part stop creating the second banknote bundle.

4. A system for packaging banknotes, comprising:
the apparatus according to claim 1;
a packaging machine that creates a packaged bundle by packaging a second predetermined number of second banknote bundles; and
a third weight measurement part that measures a weight of the packaged bundle created by the packaging machine;
wherein the controller compares the weight measured by the second measurement part with the weight measured by the third measurement part, and decides whether the number of second banknote bundles packaged as the packaged bundle is smaller than the second predetermined number.

5. The system according to claim 4, wherein
if the number of second banknote bundles packaged as the packaged bundle is smaller than the second predetermined number,
the controller makes the packaging machine stop packaging the second predetermined number of second banknote bundles.

6. A method for stacking banknotes by using a computer, the method comprising:
measuring, by the computer, a weight of a first banknote bundle, banknotes laminated along a thickness direction of the banknotes being bundled as the first banknote bundle;
measuring, by the computer, a weight of a second banknote bundle, a first predetermined number of first banknote bundles laminated being bundled as the second banknote bundle;
comparing, by the computer, the weight of the first banknote bundle with the weight of the second banknote bundle; and
deciding, by the computer, whether the number of first banknote bundles bundled as the second banknote bundle is smaller than the first predetermined number, based on a result of the comparing, wherein the measuring a weight of a first banknote bundle includes
measuring a weight of each of the first predetermined
number of first banknote bundles,
the deciding includes
if a sum of the weight of each of the first predetermined
number of first banknote bundles is not same level as
the weight of the second banknote bundle, deciding
that the number of first banknote bundles bundled as
the second banknote bundle is smaller than the first
predetermined number.

* * * * *